United States Patent [19]

Shortt

[11] Patent Number: 4,678,588
[45] Date of Patent: Jul. 7, 1987

[54] CONTINUOUS FLOW CENTRIFUGAL SEPARATION

[76] Inventor: William C. Shortt, 24637 Farmington Rd., Farmington Hills, Mich. 48018

[21] Appl. No.: 825,620

[22] Filed: Feb. 3, 1986

[51] Int. Cl.$^4$ .............................................. B01D 45/12
[52] U.S. Cl. .................................. 210/788; 209/144; 209/211; 210/512.1
[58] Field of Search .................. 210/512.1, 512.3, 304, 210/788; 55/184, 191, 204, 205, 177, 456; 209/144, 211

[56] References Cited

U.S. PATENT DOCUMENTS

| | | | |
|---|---|---|---|
| 2,754,970 | 7/1956 | Ross | 210/512.1 |
| 3,754,658 | 8/1973 | Messing | 210/304 |
| 3,807,568 | 4/1974 | Ruthrof | 210/512.1 |

OTHER PUBLICATIONS

"Wet Cyclones," *Chemical Engineering*, (Jun. 1955), pp. 234-238.

Primary Examiner—Frank Sever
Attorney, Agent, or Firm—Reising, Ethington, Barnard, Perry & Milton

[57] ABSTRACT

An apparatus and method for centrifugally separating a continuous flow of substances having differing densities along a constrained helical course. The assembly (10) comprises a helical conduit for constraining the flow having a velocity established along a closed helical tubular course (25), including an inlet (26) and an outlet (28) respectively situated at opposite terminal ends of the conduit. The invention is characterized by a peripheral outlet duct (42) disposed in either of an inner or preferably an outer periphery of the conduit between the inlet (26) and outlet (28) terminals for removing a peripheral fraction concentrated by centrifugal forces in either of the inner or outer periphery, respectively, of the conduit. An unremoved fraction of the flow is allowed to continue along the helical course to and through the terminal outlet.

16 Claims, 2 Drawing Figures

CONTINUOUS FLOW CENTRIFUGAL SEPARATION

The invention relates generally to continuous flow type centrifugal separators for separating substances of differing densities, such as solids from liquids.

BACKGROUND OF THE INVENTION

Presently, the design of centrifugal separators is primarily adapted to a liquid-solids mixture introduced tangentially at high velocity into the base of an inverted cone-like vessel so that the heavier solids are centrifugally forced outwardly toward the wall of the retaining vessel and flow by gravity toward the apex of the inverted cone, exiting the apex with a metered amount of liquid through an aperture called the underflow. The remaining liquid containing the lighter solids called the overflow flows upwardly from the center of the cone through a hollow tube outlet called the vortex finder. Devices of this type are described in the article "Wet Cyclones," *Chemical Engineering* (June 1955).

Such prior art designs are limited in the volume capable of being efficiently treated in the separator due to the physical phenomenon that increasing the size of the separating vessel to obtain adequate time for efficient separation reduces the circular velocity and, hence, the centrifugal force required to obtain efficient separation. Accordingly, a multiplicity of small volume separators are frequently used in tandem to accommodate a larger volume where a high degree of separation is required, and to avoid the high velocities and resultant power requirements necessary in larger separators to effect the same degree of separation.

U.S. Pat. No. 3,754,658 is a pulp thickener relying upon a pressurized dewatering mechanism.

Another limitation in the design of prior art centrifugal separators is the length of time that solids in a liquid-solids mixture entering such a separator are subjected to centrifugal force generated by the circular flow. In most applications, this length of time is a minute fraction of a second.

Another inherent difficulty in the design of present centrifugal separators is in determining the size and proper placement of the appropriately named vortex finder in order to provide efficient separation, since these factors vary with the inlet velocity, internal pressure, and ratio of the liquid to solid density.

A further disadvantage of present centrifugal separators is the extreme wear on certain elements of the separators subjected to heavy abrasion due to the high velocities required to effect meaningful separation in the short time a liquid-solids mixture is in the separator.

SUMMARY OF INVENTION AND ADVANTAGES

According to the instant invention, there is provided an apparatus and method for centrifugal separation of a flow of substances having differing densities along a constrained helical course.

A continuous flow centrifugal separator assembly for separating a flow of substances having differing densities along a helical course comprises a helical conduit means for constraining the flow along a closed helical tubular course. The helical conduit means includes inlet and outlet means respectively situated at opposite terminal ends of the conduit means. Flow establishing means are provided for establishing a flow velocity along the helical course between the inlet and terminal outlet means. The invention is characterized by peripheral outlet means disposed in either of an inner or outer periphery of the conduit means for removing a peripheral fraction concentrated by centrifugal forces along either of the inner or outer periphery of the flow, respectively. The remainder of the flow is allowed to continue along the helical course and through the terminal outlet means.

A method for centrifugally separating a continuous flow of substances having differing densities along a helical course comprises the steps of: defining a closed tubular helical conduit means for constraining and carrying the flow from an inlet to an outlet means respectively situated at opposite terminal ends of the conduit means; establishing a unidirectional flow velocity along the helical course between the terminal inlet and outlet means; and subjecting the flow to centrifugal force generated by the constrained helical flow velocity, forcing a denser substance by inertia to migrate through the flow to an outer periphery of the helical conduit means, concentrating in an outer peripheral fraction of the flow, while leaving a lesser density peripheral fraction remaining concentrated at an inner periphery of the conduit means. The method is characterized by the steps of: stripping or diverting either of the inner or outer concentrated peripheral fractions from the flow and removing same by peripheral outlet means situated in either of the inner or outer periphery of the conduit means, respectively. The remainder of the flow is allowed to continue along the helical course toward the terminal outlet means.

An advantage of the instant invention is the separation of substances of differing densities using a controlled and predetermined form and length of flow path as dictated by selected velocity and time calculated to produce a predicted separation and efficiency.

Another advantage of the instant invention is the fixed helical conduit form and lack of moving parts in which the physical elements of time, velocity and centrifugal force can be combined in predetermined and controllable units to produce a predictable degree of separation of substances of differing densities.

Another advantage of the instant invention is the diversion to atmosphere of a precise fractional peripheral volume of centrifuged and concentrated fractional components from the flow.

A further advantage of the invention is a lower operational flow velocity, allowing extended time to effect efficient separation with minimum energy requirements and minimal abrasion and wear to parts of the separator.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
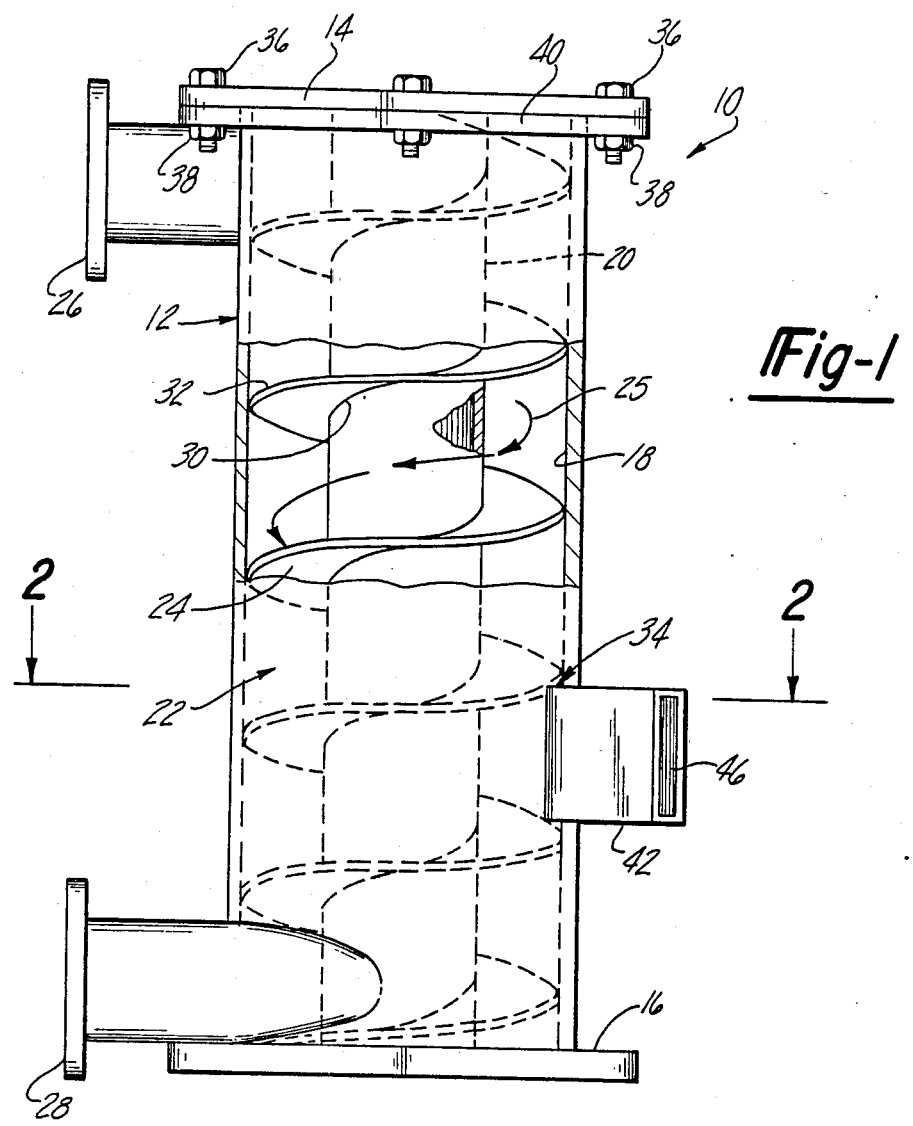
FIG. 1 is a side-elevational view of the invention.

According to the invention, there is provided an apparatus and method for centrifugally separating a continuous flow of substances having differing densities along a constrained helical course. The centrifugal separator assembly, generally shown at 10, comprises a helical conduit means that is defined by a right cylindrical housing 12 having a pair of opposed end walls 14,16 with a side wall 18 extending between and interconnecting said end walls, an inner concentric tubular element, shown here as a cylinder 20 extending between and interconnecting said end walls 14,16, defining a closed tubular or annular space 22 between said inner cylinder 20 and said side wall 18. A helical blade 24 extends within said annular space 22 to define said helical conduit means for carrying a flow of substances having differing densities along a constrained helical course. The helical blade 24 extends between an inlet means 26 and a terminal outlet means 28 within said annular space 22. The blade 24 is helically wrapped around the inner cylinder 20, with an internal edge 30 of said blade 24 in continuous helical contact with said inner cylinder 20 and the opposite or external edge 32 thereof helically abutting the side wall 18. A flow velocity is established between the inlet 26 and terminal outlet means 28 by either a flow generator (not shown) connected to the inlet 26 or a vacuum pump connected to the outlet 28 drawing the flowing mixture through the conduit means. Thus, the flow velocity can either be established by a positive or negative pressure in any conventional manner at the inlet or outlet, respectively.

Figure 2:
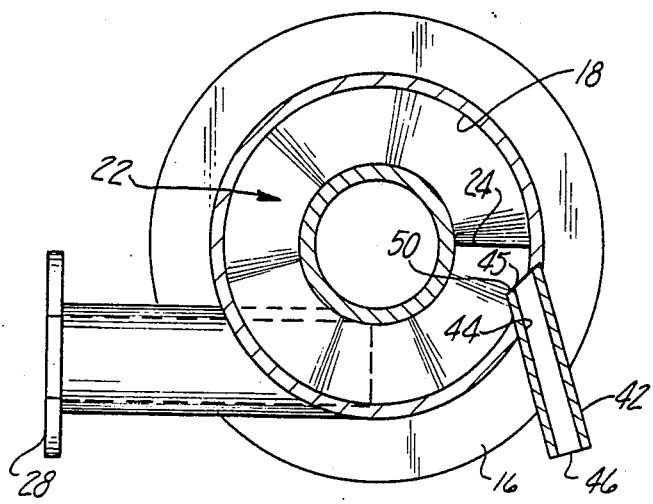
FIG. 2 is a cross-sectional view taken substantially along the lines 2—2 of FIG. 1.

A peripheral outlet means, generally indicated at 34, is shown disposed in the side wall 18 in an outer periphery of the conduit means; it should be understood that the same may also be disposed in the inner cylinder 20 at the inner periphery of the conduit means. In the case of a liquid/solid mixture, such as a coolant from a wet grinding operation, centrifugal forces will cause the solid grindings suspended in the mixture to migrate by inertia to the outer periphery of the conduit means along the helical course adjacent the side wall 18, whereupon the peripheral outlet means 34 will strip or divert the concentrated solid fraction, removing same from the flow. Conversely, a clear liquid portion will remain flowing along the inner periphery of the helical course 25 along the inner cylinder 20 and can be stripped or diverted from the flow by peripheral outlet means disposed in the inner cylinder at the inner periphery of the conduit means along the helical course. A plurality of peripheral outlet means 34 could be used in either the inner or outer peripheries of the conduit means to strip the inner or outer peripheral fractions, respectively. The remaining unremoved portion of the flow not stripped by one or more peripheral outlet means continues along the helical course and flows out through the terminal outlet 28. As shown in FIGS. 1 and 2, the conduit means preferably has a substantially rectangular cross section, although it should be understood that other configurations of the components defining the conduit means may be arranged to provide a nonrectangular cross section of the conduit means.

The inlet 26 is disposed at one end of the annular space 22 tangent to and in conjunction with the side wall 18 and the inner cylinder 20. The outlet 28 is similarly disposed at the opposite end of the annular space 22. The housing 12 and the concentric inner cylinder 20 are both closed at common ends thereof with the end wall 16 being a fixed base cover and the end wall 14 being a removable top cover held in place by bolts 36 and nuts 38 to a top ring flange 40 fixed to the housing 12, thereby forming said enclosed annular space 22 wherein the helical blade 24 extends.

The peripheral outlet means 34 preferably takes the form of a hollow rectangular duct 42 leading tangentially from an aperture 44 in the side wall 18 and terminating in a nozzle 45 (FIG. 2). Both nozzle 45 and duct 42 extend transversely between parallel turns of the helical blade 24 near the outlet 28, preferably in the outer periphery of the conduit means as shown in FIGS. 1 and 2. The exit end 46 of the rectangular duct leads to atmosphere or to a suitable solids reservoir (not shown). The nozzle 45 includes a leading edge 48 and a trailing edge 50. The leading edge 48 nearest the inlet 26 is disposed within the side wall 18 of the housing 12, avoiding any interference with the flow. The trailing edge 50 of the nozzle 45 nearest the outlet 28 is disposed inwardly from the internal surface of the side wall 18 in an outer periphery of the helical course 25, interfering with the flow therealong, stripping and diverting an outer peripheral fraction of the flow through the nozzle 45 and the duct 42. Whereas the peripheral outlet means has been shown in conjunction with the outer periphery of the conduit means, that is, disposed in the side wall 18 of the housing 12, it should be understood that the peripheral outlet means shown in FIGS. 1 and 2 could also be positioned in the inner cylinder 20, projecting inwardly through a suitable aperture and into an inner periphery of the helical course, leading tangentially therefrom to the interior of the cylinder 20 for removal through a suitable opening in the end wall 16. Either the terminal 28 or peripheral 34 outlet means may optionally include vacuum assist means (not shown) operatively connected thereto.

Although a rectangular peripheral outlet duct is shown with a nozzle 45 corresponding to the cross-sectional contour of the conduit means, other configurations than the concentric right cylinders shown in the drawings, can be used that will conform to the peripheral contours of the conduit means.

The invention comprises a coiled helical tube having a constrained flow velocity therethrough and a peripheral outlet duct with a nozzle near the terminal outlet of the tube for stripping a centrifugally concentrated peripheral fraction from the flow. The helical conduit need not be formed from concentric cylinders, nor must the axis about which the helical conduit is generated be rectilinear as is shown in the drawings. A simple peripheral outlet aperture 44 therealong could be used with the outer peripheral surface thereof corresponding to the cross-sectional contour chosen for the tube, to divert a peripheral fraction from the flow.

The assembly 10 and the method described below are preferably adapted to separate a flow comprising a liquid-solid mixture, for example, a mixture resulting from a wet machining or grinding operation. An abrasion-resistant material is contemplated for use on the side wall 18, the external wall of the inner cylinder 20 and the helical blade 24. With respect to the side wall 18, the internal surface thereof may comprise a removable and replaceable abrasion-resistant lining.

The preferred method for centrifugally separating a continuous flow of substances having differing densities along a helical course comprises the steps of first defining a closed tubular helical conduit means for constraining and carrying said flow along a helical course 25 between an inlet means 26 and an outlet means 28 situated at opposite terminal ends thereof. The conduit means is defined by positioning the inner cylinder 20 having the spirally wrapped blade 24 therearound concentrically within the cylindrical housing 12 between the pair of opposed end walls 14,16 and the connecting side wall 18, the blade 24 being wound within the annular space 22 and helically abutting an outer edge 32 of the blade 24 with the side wall 18 from the inlet 26 to outlet 28. A unidirectional constrained flow is then established along the helical course 25 between the terminal inlet 26 and outlet 28 means and is subjected to centrifugal force generated along the helical course, forcing a denser substance by inertia to migrate through the flow to an outer periphery of said helical conduit means, concentrating in an outer peripheral fraction of the flow, leaving a lesser density peripheral fraction concentrated at an inner periphery of the conduit means. The preferred method is characterized by the steps of stripping or diverting the outer concentrated peripheral fraction by one or more peripheral outlet means 34 situated in the side wall 18, and providing said peripheral outlet means 34 with a hollow rectangular duct 42 leading tangentially from the conduit means and having a nozzle 45 on one end of the duct 42 and a trailing edge 50 on the nozzle 45 for stripping and diverting the peripheral fraction from the flow by interference of said trailing edge 50 with the flow. The remainder of the flow continues along the helical course 25 toward the terminal outlet 28. Alternatively, the step of simply diverting a denser peripheral fraction through one or more apertures 44 in the side wall 18 may be used.

The step of assisting the flow by applying suction or vacuum means (not shown) to the peripheral outlet 34 means may be used.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A centrifugal separator assembly (10) for separating a continuous flow of substances having differing densities along a helical course, said assembly (10) comprising:
    a closed tubular helical conduit means (22) having a predetermined length defining a spiral path having top and bottom walls and for constraining the flow solely along said helical course (25) including inlet means (26) and outlet means (28) situated at opposite terminal ends of said conduit means and leading tangentially into and out of said conduit means, respectively; flow establishing means for establishing a flow velocity along said helical course (25) between said inlet means and said terminal outlet means of sufficient force to inertially separate the substances of different densities and form a peripheral fraction; and shearing means for shearing off the entire peripheral fraction of the flow of substance from the remainder of the flow prior to the flow reaching the terminal outlet means, said shearing means including an opening (34) extending from said top wall to said bottom wall on said path spaced from said inlet means, said opening being disposed in an inner or outer periphery of said conduit means between said inlet (26) and terminal outlet (28) means for removing the peripheral fraction of the flow concentrated by centrifugal forces in said inner or outer periphery of said helical course, allowing the unremoved fraction of the flow to continue therealong through said terminal outlet means (28).

2. An assembly as set forth in claim 1 further characterized by said conduit means being defined by:
    a housing (12) having a pair of opposed end walls (14,16) with a side wall (18) extending between and interconnecting said end walls; an inner concentric tubular element (20) extending between and interconnecting said end walls (14,16), defining a closed tubular space (22) between said inner tubular element (20) and said side wall (18);
    a helical blade (24) extending within said tubular space (22) between said inlet means (26) and said terminal outlet means (28) and having an internal (30) and an external (32) edge thereof in conjunction with said inner tubular element (20) and said side wall (18), respectively, defining said helical course (25), said peripheral outlet means (34) being disposed between adjacent parallel turns of said helical blade.

3. An assembly as set forth in claim 2 further characterized by said peripheral outlet means (34) being disposed in said side wall (18) for removing a denser outer peripheral fraction from the flow.

4. An assembly as set forth in either of claims 1 or 2 futher characterized by said conduit means having a substantially rectangular cross section with said inner tubular element (20) and said housing (12) comprising concentric right cylinders.

5. An assembly as set forth in claim 2 further characterized by said opposing end walls (14,16) including a fixed cap (16) and a removable cap (14).

6. An assembly as set forth in claim 2 further characterized by said side wall (18), said inner tubular element (20) and said helical blade member (24) being of an abrasion-resistant material.

7. An assembly as set forth in claim 1 further characterized by an aperture (44) diverting a peripheral fraction from the flow.

8. An assembly as set forth in claim 1 further characterized by a hollow duct (42) leading tangentially from a tangential aperture (44) in an inner or an outer periphery of said conduit means, said duct terminating in a nozzle (45) extending transversely between parallel turns of said helical blade (24) and including a leading edge (48) and a trailing edge (50) spaced inwardly from said leading edge (48) and disposed in the flow for stripping the peripheral fraction therefrom and removing the fraction externally through said duct (42).

9. An assembly as set forth in either of claims 7 or 8 further characterized by said peripheral outlet means including vacuum assist means operatively connected thereto.

10. An assembly as set forth in claim 8 further characterized by said duct (42) and said nozzle (45) having a rectangular cross section.

11. A method for centrifugally separating a continuous flow of substances having differing densities along a helical course (25), said method comprising the steps of:
    (a) defining a closed tubular helical conduit means having top and bottom walls for constraining and carrying the flow along a helical course (25) from a tangential inlet means (26) to a tangential outlet means (28) situated at opposite terminal ends of said conduit means;
(b) establishing a unidirectional constrained flow velocity along said helical course (25) between said terminal inlet (26) and outlet (28) means;
(c) subjecting the flow to centrifugal force generated by the flow velocity along said constrained helical course (25);
(d) forcing a denser substance by inertia to migrate through the flow to an outer periphery of said helical conduit means, concentrating in an outer peripheral fraction of the flow, leaving a less dense peripheral fraction remaining concentrated at an inner periphery of said conduit means; and
   (1) shearing off an entire one of the peripheral fractions through an opening in the conduit means between the terminal ends of the conduit and extending from the top wall to the bottom wall;
   (2) allowing the remainder of the flow to continue along said helical course and out through said terminal outlet means (28).

12. A method as set forth in claim 11 further characterized by the step of: defining said conduit means by positioning a tubular element (20) having a spirally wrapped blade (24) therearound concentrically within a housing (12) between a pair of opposed end walls (14,16) and a connecting side wall (18) of said housing (12), said blade (24) being wound within a tubular space (22) between said side wall (18) and said tubular element (20) and having an outer lateral edge (32) helically abutting said side wall (18) beginning from said inlet (26) means in conjunction with one end of said blade (24) and continuing thence helically to said terminal outlet means (28) and in conjunction with the opposite end thereof.

13. A method as set forth in either of claims 11 or 12 further characterized by the step of: stripping or otherwise diverting a denser peripheral fraction concentrated by centrifugal forces in the outer periphery of said helical course (25) by peripheral outlet means (34) disposed in said outer periphery of said conduit means.

14. A method as set forth in either of claims 11 or 12 further characterized by the step of diverting a centrifugally separated peripheral fraction from the flow through an aperture (44) formed in either of said inner or outer periphery of said conduit.

15. A method as set forth in claim 14 further characterized by the step of applying vacuum to either of said peripheral (34) and terminal (28) outlet means.

16. A method as set forth in claim 14 further characterized by the step of removing the peripheral fraction from the flow by providing a hollow duct (42) leading tangentially from said conduit means and projecting inwardly from said aperture (44) and a nozzle (45) on one end of said duct (42) and a trailing edge (50) on said nozzle (45) for stripping and diverting a peripheral fraction from the flow by said trailing edge (50) projecting inwardly from said side wall (18) and interfering with the flow, removing the fraction tangentially outwardly through said duct (42).

* * * * *